United States Patent [19]

Spars

[11] 3,950,503

[45] Apr. 13, 1976

[54] CALCINATION-DESULFURIZATION OF GREEN COKE WITH CONCURRENT SULFUR PRODUCTION

[75] Inventor: Byron G. Spars, Mill Valley, Calif.

[73] Assignee: Chevron Research Company, San Francisco, Calif.

[22] Filed: Sept. 27, 1974

[21] Appl. No.: 509,884

[52] U.S. Cl. ............... 423/574 R; 423/461; 44/1 F
[51] Int. Cl.² .......................................... C01B 17/06
[58] Field of Search ...... 423/461, 474, 476; 201/25, 201/17; 44/1 R

[56] References Cited
UNITED STATES PATENTS

| | | | |
|---|---|---|---|
| 2,721,169 | 10/1955 | Mason et al. | 423/461 |
| 3,759,673 | 9/1973 | Whitten et al. | 423/461 |

FOREIGN PATENTS OR APPLICATIONS

| | | | |
|---|---|---|---|
| 17,816 | 11/1962 | Japan | 423/576 |

*Primary Examiner*—G. O. Peters
*Attorney, Agent, or Firm*—G. F. Magdeburger; R. H. Davies; J. J. De Young

[57] ABSTRACT

In a staged calcination process a sulfur-containing green coke is converted to a low-sulfur-content coke and two off-gas streams, one which contains sulfur dioxide and another which contains hydrogen sulfide. In one stage the green coke is calcined and partially desulfurized under oxidative conditions at a temperature in the range 1000° to 3000°F. In a second stage, the calcination and desulfurization is continued by heating the coke from 2000° to 4000°F under substantially reducing conditions. Preferably the reaction times and conditions in the stages are adjusted to result in the production of two mols of hydrogen sulfide per mol of sulfur dioxide. Portions of the two off-gas streams are mixed and reacted to form elemental sulfur.

6 Claims, 1 Drawing Figure

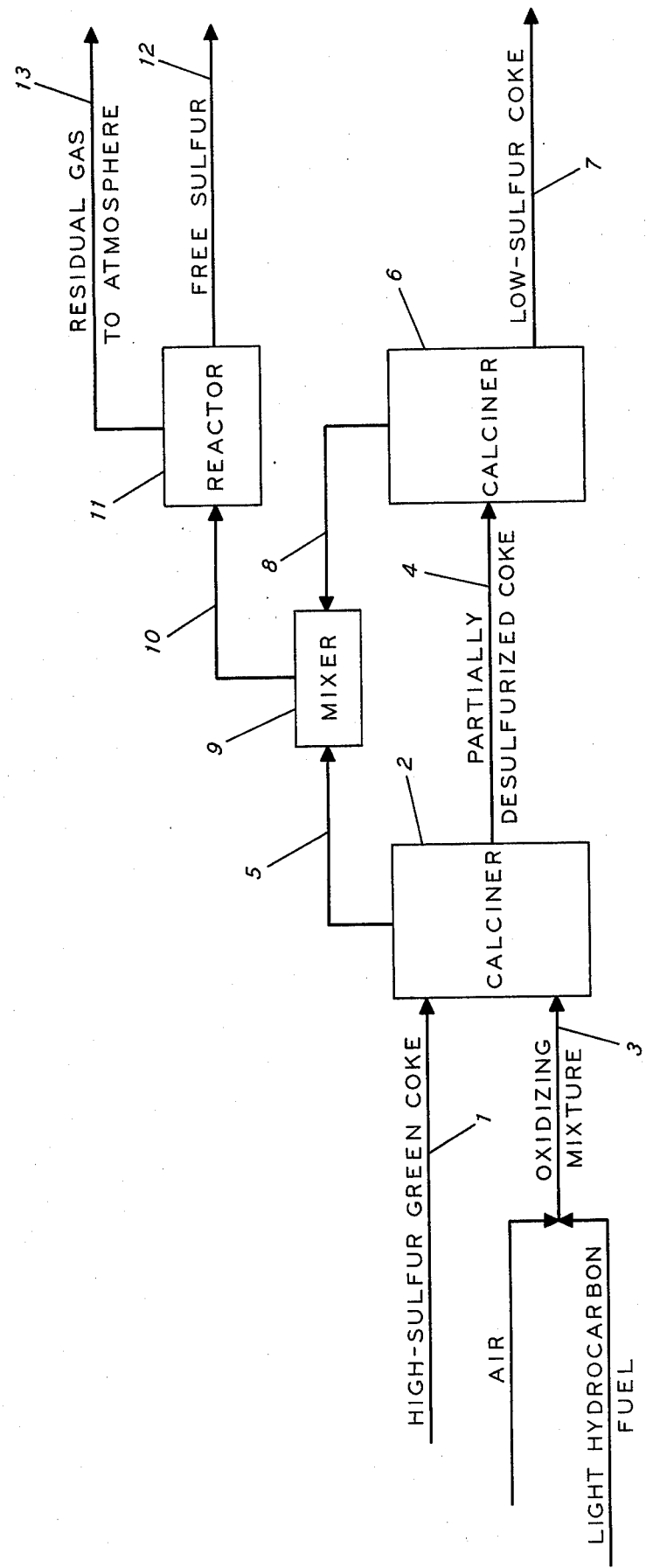

CALCINATION-DESULFURIZATION OF GREEN COKE WITH CONCURRENT SULFUR PRODUCTION

BACKGROUND OF THE INVENTION 1. Field of the Invention

This invention is a process for producing elemental sulfur and a calcined low-sulfur-content coke from a green high-sulfur-content coke. More particularly, it relates to a staged green coke desulfurization process which includes a first oxidative calcination stage in which a sulfur dioxide-containing off-gas is produced and a second high-temperature desulfurization-calcination stage in which a hydrogen sulfide-containing off-gas is produced. Yet more particularly, free sulfur is produced by mixing and reacting these off-gases.

Petroleum coke is extensively used in industry, notably as the major constituent of carbon electrodes as packing material in the baking of carbon electrodes and in metallurgy. The greatest proportion of petroleum coke currently available is the product obtained in delayed coking of heavy refinery residual oils and tar. This coke (green coke) is not pure carbon but also contains heavy hydrocarbon compounds and other inorganic impurities. The green coke is unsuitable for the uses mentioned above, and must be calcined. In this step, the hydrocarbons are converted to carbon and volatile matter and the physical structure of the coke is altered.

In the calcination of green coke large volumes of exhaust gases are produced from the calciner. This gas presents a pollution control problem because of the presence of noxious sulfur compounds. This pollution control problem is being compounded by the fact that many of the coker feeds available today have higher sulfer contents then those available in the past. Today, the sulfur content of petroleum cokes often ranges from 4 to 8% sulfur or higher. In general, for industrial purposes, a satisfactory calcined coke usually has a sulfur content below about 2 weight percent and preferably 1 weight percent or lower.

One objective of the process herein is to produce a satisfactory calcined low-sulfur-content coke and at the same time produce a sulfur dioxide-containing gas and a hydrogen sulfide-containing gas which can be used conveniently for other purposes, including the production of elemental sulfur and a residual gas more suitable for venting to the atmosphere. Other objectives will be clear from the following description.

2. Description of the Prior Art

The prior art suggests methods for desulfurizing a green coke by calcining the coke at an elevated temperature. U.S. Pat. No. 2,824,047 shows desulfurizing of a carbonaceous solid using hydrogen gas and an acceptor for hydrogen sulfide which is converted to sulfur dioxide when the acceptor is regenerated.

U.S. Pat. No. 2,734,853 discloses a multistage coke calcining process in which air or a free oxygen-containing gas is employed.

U.S. Pat. No. 3,369,871 shows a three-stage process for the removal of sulfur from a green coke in which the coke is first heated with oxidizing gases to 600°–900°F, then heated to 1600°C (2910°F), and then heated with oxidizing gases to 600°–900°F.

U.S. Pat. No. 3,723,291 shows desulfurizing a green coke which has been impregnated with an alkali metal carbonate. The impregnated coke is heated in the presence of hydrogen gas to a temperature of at least 1000° up to about 2000°F. Evolved hydrogen sulfide is separated from the off-gas by scrubbing.

U.S. Pat. No. 2,721,169 discloses a multistage coke calcining process in which the coke is first subjected to a low-temperature oxidation from 650° to 1000°F followed by a second stage hydrogen gas treatment at 1200° to 1700°F.

The prior art also teaches in a Russian article, "Otraslevaia Konferentsiia po pererabotke vysokosernistykh neftei Materialy," 1st, Ufa, 1965, pp. 119–126; 137–138; 224–234, that sulfur can be removed from coke principally in the form of $H_2S$ by heating coke in an electrothermal resistance furnace.

The prior art contains information on the effects of certain process variables in the desulfurization of petroleum coke as disclosed in the papers:

1. "Desulfurization of Petroleum Coke During Calcination," by Franc Sef, Industrial & Engineering Chem., Vol. 52, No. 7, July 1960, Pages 599–600; and
2. "Desulfurization of Petroleum Coke," by S. J. Lukasiewiez and G. C. Johnson, Industrial & Engineering Chem., Vol. 52, No. 8, August 1960, Pages 675–677.

SUMMARY OF THE INVENTION

In accordance with the embodiment of the present invention, there is provided a process for the production of a calcined low-sulfur-content coke and elemental sulfur from a green coke having a substantial sulfur content which comprises:

a. producing a sulfur dioxide-containing off-gas and a partially desulfurized coke by calcining said green coke under oxidative calcining conditions including a temperature in the range of 1000° to 3000°F;

b. producing a hydrogen sulfide-containing off-gas and said low-sulfur-content coke and continuing the calcination of said partially desulfurized coke by heating said coke under desulfurization reducing conditions including a temperature in the range 2000° to 4000°F; and c. forming elemental sulfur and water by combining and reacting at least a portion of said sulfur dioxide-containing off-gas with at least a portion of said hydrogen sulfide-containing off-gas.

DESCRIPTION OF THE INVENTION

By "a substantial sulfur content", as used herein, is meant a content by weight of at least 2% calculated as free sulfur and relating to sulfur in any form in the green coke, including elemental sulfur, organically bound sulfur, and inorganically bound sulfur. Green cokes often contain 4–8 or more weight percent sulfur.

By "calcined low-sulfur content coke", as used herein, is meant a coke having a sulfur content less than 2 weight percent and preferably less than 1 weight percent. By "oxidative calcining conditions", as used herein, is meant:

a. a temperature in the range 1000° to 3000°F, and more preferably a temperature from 2000° to 2500°F;

b. a calcination period in the range 0.1 to 4 hours or more; and c. the introduction of at least sufficient molecular oxygen into the calciner for the substantially complete oxidation of sulfur in the off-gas to sulfur dioxide.

During this first-stage calcination small quantities of volatile hydrocarbons are also driven off. These hydrocarbons may react with the sulfur to form hydrogen sulfide, but preferably any hdyrogen sulfide formed is concurrently oxidized by the excess oxygen present in this stage so that less than 5 and preferably less than 1 volume percent hydrogen sulfide is present in the off-gas.

By "desulfurization-reducing conditions", as used herein, is meant:

a. use of a temperature in the range 2000° to 4000°F, and more preferably a temperature from 2500° to 3000°F;

b. a calcination period in the range 0.1 to 4 or more hours; and c. maintaining a reducing atmosphere in the reaction zone by substantially excluding excess molecular oxygen from the reaction zone, i.e., less than 5 volume percent of the evolved hydrogen sulfide is oxidized.

Preferably oxygen-containing compounds, including carbon dioxide and carbon monoxide, are also excluded from the second-stage calciner. Hydrogen can also be added to the second-stage calciner, but preferably the hydrogen required for the formation of $H_2S$ is supplied by the decomposition (cracking) of the volatiles liberated from the partially desulfurized coke.

In general, the temperature in the oxidative stage will be significantly lower than that in the second desulfurization-reducing stage. At the lower temperature in the oxidation stage the rate and quantity of production of $SO_2$ is easily controlled, whereas if high temperatures are utilized, i.e., greater than 3000°F, then control of the residence time and reaction rate to produce the desired quantity of $SO_2$ becomes difficult. Higher temperatures, 2000°F and greater, and preferably 2500° to 3000°F, are necessary in the second-stage hydrodesulfurization in order to liberate the sulfur from the coke.

The effect of time and temperature in the desulfurization-reducing second stage is further apparent from the data in Table I.

can be conveniently and easily changed. In the preferred case where the production of free sulfur from the sulfur removed from the coke is the primary object, the desirable ratio of 2 mols of hydrogen sulfide per mol of sulfur dioxide ($2H_2S + SO_2 \rightarrow 3S + 2H_2O$) is readily achieved by routine time-temperature adjustments in the separate calcination stages. Similarly, where it is desired to use a portion of either the sulfur dioxide or hydrogen sulfide in some other process, then adjustment of these variables can also be made to favor one or the other product.

Conventional methods for the production of sulfur by the reaction of hydrogen sulfide with sulfur dioxide are contemplated herein. Representative conventional processes for the production of sulfur include the Claus sulfur process (cf. U.S. Pat. No. 3,666,418); reaction in a carboxamide solvent as in U.S. Pat. No. 3,023,088; reaction in other organic solvents as in U.S. Pat. No. 2,987,379 as well as U.S. Pat. No. 3,454,354; and the like conventional sulfur-producing reaction systems employing sulfur dioxide and hydrogen sulfide.

In the Claus sulfur process hydrogen sulfide is first combusted with an oxygen-containing gas to produce a gas product mixture containing approximately 2 mols of $H_2S$ for every mol of $SO_2$. One advantage of the present process is that the combustion step normally associated with Claus plants is unnecessary since in the present invention one advantageously controls the production of $H_2S$ and $SO_2$ in the staged calcinations so that approximately one-third of the sulfur liberated is in the form of $SO_2$ and two-thirds in the form of $H_2S$.

DRAWINGS

The invention will best be understood, and further objects and advantages thereof will be apparent from the following detailed description when read in conjunction with the accompanying drawing. The drawing is a diagrammatic illustration of one perferred embodiment of the invention.

PROCESS OPERATION

TABLE I

EFFECT OF TIME AND TEMPERATURE ON SULFUR LOSS DURING CALCINATION-EXTENDED HIGH TEMPERATURE RANGE

|  | Temp., °F | Time, Hr | Calcining Yield, Wt % | Sulfur, Wt % | Real Density g/cc |
|---|---|---|---|---|---|
| Arabian Light Coke* | 2400 | 4 | 88.5 | 5.14 | 2.007 |
|  | 2700 | 1 | — | 1.26 |  |
|  | 2700 | 4 | 80.3 | 0.54 |  |
|  | 2800 | 0.5 | 80.0 | 1.27 | 2.103 |
|  | 2900 | 0.25 | 81.1 | 1.27 |  |
|  | 2900 | 0.5 | 78.2 | 0.64 | 1.61/1.78 |
| California Coke** | 2700 | 4 | 84.5 | 1.10 |  |
|  | 2800 | 0.5 | 80.6 | 1.17 |  |
|  | 2900 | 0.5 | — | 0.94 |  |

*Initial sulfur content — 7.3 wt %
**Initial sulfur content — 1.4 wt %

The data in Table I illustrate that for Arabian Light Coke little desulfurization occurred at 2400°F even with a 4 hour residence time but that the rate of desulfurization rapidly increased with an increase in temperature from 2400°F to 2700°F. The effect of time and temperature will of course vary depending on the particular source of the coke, but these variables can readily be adjusted by one skilled in the art.

A particular advantage of the present process lies in its flexibility. Thus, the relative amounts of the evolved sulfur converted to hydrogen sulfide or sulfur dioxide Referring now to the drawing, a green petroleum coke having a sulfur content of about 7 weight percent is introduced via transfer line 1 into a conventional calcining vessel, 2, for example a rotating kiln, rotary hearth or a fluidized bed as in U.S. Pat. No. 2,693,999. Preferably a rotary hearth-type calciner is used for the first-stage calcination. The kiln, 2, and its contents are maintained at a temperature of about 2,500°F by the combustion of an air-light hydrocarbon fuel mixture which is introduced to calciner 2 via line 3. This mixture is oxygen-rich relative to the oxygen requirement for the complete combustion of the added fuel in the mixture and for the combustion of volatile hydrocarbons evolving from the green coke at the process temperature. The excess oxygen introduced into calciner 2 is consumed by a concurrent oxidation to sulfur dioxide of the sulfur liberated during the calcination. The relative amount of molecular oxygen gas introduced into the calciner is conveniently controlled by noting the content of the off-gas stream which is withdrawn from the calciner 2 via line 5. Thus, if this stream contains any significant amount of hydrogen sulfide, insufficient oxygen was present in the calciner. Most conveniently, the amount of molecular oxygen introduced into the calciner is initially on the low side, i.e., insufficient for complete oxidation to sulfur dioxide of all of the hydrogen sulfide in the off-gas stream and the oxygen level is increased until little or no, less than 5 and preferably less than 1 volume percent, hydrogen sulfide is present in the off-gas. Control of the process and analysis of the off-gas streams is conveniently carried out by ordinary means, for example, by gas/liquid chromatography.

The amount of the light hydrocarbon fuel which is introduced and combusted in the calciner varies depending upon the amount of volatilizable materials present in the green coke. This material is also combusted and together with the light hydrocarbon fuel furnishes the heat required to maintain the desired 2,500°F temperature for the calcination. As the calcination progresses and the amount of volatilizable material decreases, minor increases in the amount of the light fuel may be necessary in order to maintain the calcination temperature.

When the desired amount of sulfur, usually about 30% of the original sulfur content of the green coke, has been converted to sulfur dioxide, the first-stage calcination in calciner 2 is completed and the partially desulfurized coke is transferred via line 4 to calciner 6. From calciner 2 the off-gas stream containing sulfur dioxide is withdrawn via line 5 and passed to mixer 9.

Calciner 6 is maintained at a temperature of about 2800°F. Preferably the second-stage, partially sulfur-reduced coke is heated in the substantial absence of air and oxygen-containing compounds, such as carbon monoxide and carbon dioxide, using an electrothermal furnace. More preferably an electrothermal resistance furnace is utilized. Electrothermal furnaces are well known in the art; see, for example, "Industrial Chemistry," by E. R. Riegel, Ch. 17, Reinhold Publishing Corp.,3rd Ed., 1973, or U.S. Pat. No. 3,369,871. The use of an electrothermal furnace and the absence of oxygen-containing compounds increases the yield of coke, since a portion of the carbon is not consumed in providing heat. Additionally, with a reducing atmosphere the principal reaction occurring is desulfurization and the sulfur removed is evolved as hydrogen sulfide. Only small portions of the sulfur are evolved in the form of mercaptans, carbon disulfide, sulfur dioxide, etc. Alternatively, the second-stage calciner can be heated by the introduction of an air-light hydrocarbon fuel mixture which burns in the calciner and furnishes the required heat. The air-fuel mixture is regulated so that the hydrocarbon fuel is rapidly consumed and there is essentially no excess oxygen in the calciner. The off-gas contains hydrogen sulfide and is withdrawn from calciner 6 via line 8 and passed to mixer 9 for mixing therein with the sulfur dioxide produced in calciner 2. Via line 7 a low-sulfur-content coke is withdrawn from calciner 6. The calcined coke is then quenched with water and this product is suitable for use as a metallurgical grade coke, alumina electrode manufacture, or other known uses.

Via line 10 the resulting gaseous mixture is withdrawn from mixer 9 and passed to reactor 11 for conversion to free sulfur by the reaction of hydrogen sulfide with sulfur dioxide. Reactor 11 may be any suitable reaction system, as known in the art, for the conversion of hydrogen sulfide and sulfur dioxide to free sulfur; for example, a Claus reactor charged with a Claus-type catalyst for the production of sulfur by the vapor-phase reaction of hydrogen sulfide and sulfur dioxide (see, for example, U.S. Pat. No. 3,666,418). Free sulfur is withdrawn from reactor 11 via line 12. A residual gas mixture is withdrawn from reactor 11 via line 13 and may be vented to the atmosphere or further processed as desired.

"Green (uncalcined) coke", as known in the art, which has a substantial sulfur content, including elemental sulfur, organically bound sulfur and inorganically bound sulfur, is contemplated for use in the instant process. The production of green coke is well known in the art and is not, per se, a part of the present invention. Representative green cokes include petroleum coke, as well as cokes prepared from other sources, such as from coal, carbonized industrial wastes, and the like. Preferred green cokes for use as feedstocks in the present process are the petroleum cokes.

Calciners suitable for use in the present process are the conventional calciners, as known in the coking art. Representative calciners include rotating kilns, rotary hearths, fluid bed units, and the like. As discussed earlier, it is preferred to use an electrothermal resistance calciner for the second-stage calciner.

The hydrogen sulfide-containing and sulfur dioxide-containing off-gases produced in the process of the present invention are used in part or whole for the production of free sulfur. Excess sulfur dioxide or hydrogen sulfide may be used for a variety of purposes, including the production of sulfuric acid by conventional oxidation methods for the oxidation of sulfur dioxide to sulfur trioxide, etc. and/or the hydrogen sulfide may be used as a feed to an acid plant for the production of sulfuric acid and the like.

What is claimed is:

1. A process for the production of a calcined low-sulfur-content coke and elemental sulfur from a green coke having a substantial sulfur content which comprises:
   a. producing a sulfur dioxide-containing off-gas and a partially desulfurized coke by calcining said green coke under oxidative conditions including a temperature in the range 1000°to 3000°F,
   b. producing a hydrogen sulfide-containing off-gas and said low-sulfur-content coke by calcining said partially desulfurized coke under reducing conditions including a temperature in the range 2000°to 4000°F; and
   c. forming elemental sulfur and water by combining and reacting at least a portion of said sulfur dioxide-containing off-gas with at least a portion of said hydrogen sulfide-containing off-gas.

2. The process of claim 1 wherein the rates of production of said sulfur dioxide-containing off-gas and said hydrogen sulfide-containing off-gas are controlled to produce hydrogen sulfide and sulfur dioxide in approximately the stoichiometric amounts necessary for the reaction to form said elemental sulfur.

3. The process of claim 1 wherein said oxidative conditions include a temperature in the range 2000° to 2500°F.

4. The process of claim 1 wherein said reducing conditions include a temperature in the range 2500° to 3000°F.

5. A process of claim 2 wherein said oxidative conditions include a temperature in the range 2000° to 2500°F and said reducing conditions include a temperature in the range 2500° to 3000°F.

6. The process of claim 5 wherein said hydrogen sulfide off-gas is formed by heating said partially desulfurized coke in an electrothermal resistance furnace in the substantial absence of oxygen-containing compounds.

* * * * *